(12) United States Patent
Chang et al.

(10) Patent No.: US 9,846,650 B2
(45) Date of Patent: Dec. 19, 2017

(54) TAIL RESPONSE TIME REDUCTION METHOD FOR SSD

(71) Applicant: Samsung Electronics Co., Ltd., Suwon-si, Gyeonggi-do (KR)

(72) Inventors: Mu-Tien Chang, San Jose, CA (US); Dimin Niu, Sunnyvale, CA (US); Hongzhong Zheng, Sunnyvale, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 109 days.

(21) Appl. No.: 14/732,654

(22) Filed: Jun. 5, 2015

(65) Prior Publication Data

US 2016/0267011 A1    Sep. 15, 2016

Related U.S. Application Data

(60) Provisional application No. 62/130,597, filed on Mar. 9, 2015.

(51) Int. Cl.
*G06F 12/08* (2016.01)
*G06F 12/0877* (2016.01)
*G06F 3/06* (2006.01)

(52) U.S. Cl.
CPC ........ *G06F 12/0877* (2013.01); *G06F 3/0611* (2013.01); *G06F 3/0656* (2013.01); *G06F 3/0659* (2013.01); *G06F 3/0679* (2013.01); *G06F 2212/60* (2013.01); *G06F 2212/7203* (2013.01)

(58) Field of Classification Search
CPC ...... G06F 3/061; G06F 3/0629; G06F 3/0656; G06F 3/0688; G06F 12/0877; G06F 13/1626; G06F 13/1642; G06F 13/1673; G06F 2003/0691; G06F 2212/60; G06F 2212/7203
USPC ............... 710/52, 53, 74; 711/103, 118, 169
See application file for complete search history.

(56) References Cited

U.S. PATENT DOCUMENTS

| | | | | |
|---|---|---|---|---|
| 5,412,780 | A * | 5/1995 | Rushton | G06F 3/0601 711/113 |
| 5,919,251 | A * | 7/1999 | Tran | G06F 5/10 710/52 |
| 7,882,320 | B2 * | 2/2011 | Caulkins | G11C 16/10 711/103 |
| 2011/0231610 | A1 * | 9/2011 | Yano | G06F 12/0246 711/118 |
| 2011/0292058 | A1 | 12/2011 | Herr et al. | |
| 2013/0019053 | A1 * | 1/2013 | Somanache | G06F 13/1684 711/103 |
| 2013/0262745 | A1 * | 10/2013 | Lin | G06F 3/061 711/103 |
| 2014/0195699 | A1 | 7/2014 | Sokol, Jr. et al. | |
| 2014/0241699 | A1 * | 8/2014 | Honda | H04N 21/2401 386/248 |

(Continued)

*Primary Examiner* — Gary Portka
(74) *Attorney, Agent, or Firm* — Renaissance IP Law Group LLP

(57) ABSTRACT

A Solid State Drive (SSD) is disclosed. The SSD can include a host interface logic, a data input buffer, a data output buffer, and a buffer manager to manage the data input buffer and data output buffer. A re-order logic can advise the buffer manager about which data should be returned to the host computer from the data output buffer.

17 Claims, 16 Drawing Sheets

(56) References Cited

U.S. PATENT DOCUMENTS

2014/0281171 A1 9/2014 Canepa
2014/0325013 A1 10/2014 Tamir et al.

\* cited by examiner

| Data Input Buffer | |
|---|---|
| Address | Trans. ID |
| 0x1400 | 9 |
| 0x3400 | 10 |
| 0x1800 | 11 |
| 0x1600 | 12 |
| 0x6800 | 13 |
| 0x9200 | 14 |
| 0x0400 | 15 |
| 0x0700 | 16 |

Assigned by re-order logic

From host

FIG. 3

| | |
|---|---|
| 0 | 3 |
| 1 | 6 |
| 3 | 7 |
| 0 | 2 |
| 2 | 5 |
| 1 | 4 |
| 3 | 1 |
| 0 | 0 |
| Channel | Trans. ID |
| Data Output Buffer | |

Arrows: 740, 735, 730, 725, 720, 715, 710, 705

| Request Cycle | Return Cycle | Receive Cycle | Latency |
|---|---|---|---|
| 3 | 150 | 175 | 172 |
| 6 | 104 | 225 | 219 |
| 7 | 101 | 250 | 243 |
| 2 | 100 | 125 | 123 |
| 5 | 55 | 200 | 195 |
| 4 | 54 | 150 | 146 |
| 1 | 51 | 100 | 99 |
| 0 | 50 | 75 | 75 |

TAIL RESPONSE TIME REDUCTION METHOD FOR SSD

RELATED APPLICATION DATA

This application claims the benefit of U.S. Provisional Patent Application Ser. No. 62/130,597, filed Mar. 9, 2015, which is hereby incorporated by reference for all purposes.

FIELD

The inventive concept pertains to reducing data access times, and more particularly to reducing data access time from Solid State Drives (SSDs).

BACKGROUND

Solid State Drives (SSDs) can utilize multiple flash memory chips organized using multiple channels. This architecture can result in data requests being satisfied in a different order than the order in which the requests were made. For example, if an SSD receives two data requests that can be satisfied using a first memory channel and then a third data request that can be satisfied using a second memory channel, the third data request can be returned from the appropriate flash memory chip before the second data request is satisfied.

This architecture introduces parallelism into the system, allowing more than one data request to be satisfied at a time. This parallelism can be beneficial: in general, data can be returned faster in such a parallel architecture than in a serial architecture where each request must be satisfied before the next request can be satisfied. As a result, the average response time of the SSD is improved.

But a bottleneck still exists in the system. All data requests and responses pass through the interface that exists between the SSD and the host computer that issued the data requests, and the host computer needs to process one datum before it can process the next datum. If that interface is busy sending one datum back to the host computer, that interface cannot be used to send another datum back to the host computer. Continuing the earlier example, if the interface is busy sending the data from the second data request back to the host computer, the interface cannot send the data from the third data request back to the host computer. Put another way, the time required to send data from the SSD back to the host computer includes the latency of the host computer in processing data it receives from the SSD. The data from the third data request can end up waiting a long time before it is sent back to the host computer. Thus, while parallelism can reduce the average response time of the SSD, parallelism can increase the worst case response time of the SSD.

A need remains for a way to improve the worst case response time of data requests.

BRIEF DESCRIPTION OF THE DRAWINGS

FIG. 3 shows data requests being received by the data input buffer of the SSD of FIG. 1.

FIG. 7B shows the tail response time of the example data requests of FIG. 7A using an SSD with an embodiment of the inventive concept.

DETAILED DESCRIPTION

Solid State Drives (SSDs) can have good average response times, but terrible tail response (that is, worst case response) times. With better tail response times, SSDs could provide a higher quality of service and a better user experience.

Figure 1:
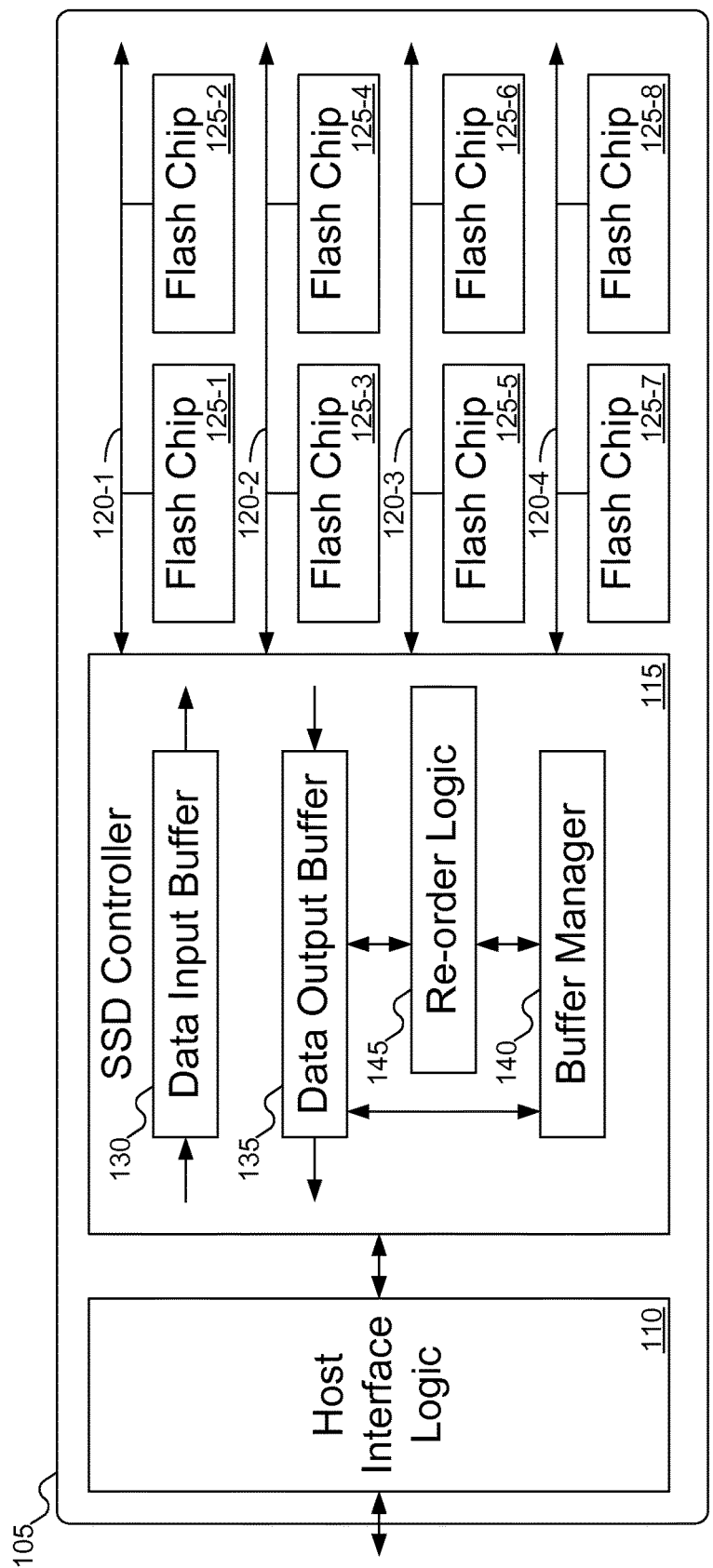
FIG. 1 shows a Solid State Drive (SSD) to reduce tail response time, according to an embodiment of the inventive concept.

FIG. 1 shows a Solid State Drive (SSD) to reduce tail response time, according to an embodiment of the inventive concept. In FIG. 1, SSD 105 is shown. SSD 105 can include host interface logic 110, which can provide an interface between SSD 105 and a host computer (such as computer system 205, shown in FIG. 2 below). SSD 105 can also include SSD controller 115, various channels 120-1, 120-2, 120-3, and 120-4, along which various flash memory chips 125-1, 125-2, 125-3, 125-4, 125-5, 125-6, 125-7, and 125-8 can be arrayed. Although FIG. 1 shows four channels and eight flash memory chips, a person skilled in the art will recognize that there can be any number of channels including any number of flash memory chips.

SSD controller 115 can include data input buffer 130, data output buffer 135, buffer manager 140, and re-order logic 145. Data input buffer 130 can receive data requests from host interface logic 110 (which data requests can originate from host computer system 205). Data output buffer 135 can receive data from flash memory chips 125-1, 125-2, 125-3, 125-4, 125-5, 125-6, 125-7, and 125-8: the data received can be responsive to the data requests received by data input buffer 130. The data in data output buffer 135 can be sent via host interface logic 110 back to host computer system 205.

Buffer manager 140 can manage data input buffer 130 and data output buffer 135. Buffer manager 140 can select a data request from data input buffer 130 to send to a flash memory chip. Generally, the request closest to the "top" of data input buffer 130 that requests data from an open memory channel can be selected. (The term "top" was put in quotation marks because data input buffer 130 can be implemented, for example, using a circular queue, which does not have a literal "bottom" or "top" from which data requests can be inserted or deleted. This also applies to data output buffer 135: either or both of data input buffer 130 and data output buffer 135 can be implemented using any desired buffer technology.)

An example might help to clarify how buffer manager 140 can manage data input buffer 130. Assume that host computer system 205 sends three data requests. The first and second data requests request data from flash memory chip 125-1, and the third data request requests data from flash memory chip 125-3. As can be seen, the first two data requests are on channel 120-1, and the third data request is on channel 120-2. (The channel of the data request can be determined in any desired manner. For example, the channel can be determined by masking out certain bits from the address of the data request.). Buffer manager 140 can select the first data request for transmission to channel 120-1. But as channel 120-1 is now in use, the second data request cannot currently be satisfied. On the other hand, the third data request, using channel 120-2, can be satisfied. So buffer manager 140 can select the third data request to send on channel 120-2 before the second data request.

Buffer manager 140 can also select which data request to remove from data output buffer 135 and send to host computer system 205. In SSDs that do not include embodiments of the inventive concept, buffer manager 140 can select the data that was added to data output buffer 135 the earliest (that is, the data that has been waiting in data output buffer 135 the longest, which can be described as the "longest resident data" in data output buffer 135). But in SSDs that include embodiments of the inventive concept, SSD controller 115 can include re-order logic 145, which provides information to buffer manager 140 as to which data to return from data output buffer 135 to host computer system 205.

In some embodiments of the inventive concept, re-order logic 145 can review the data in data output buffer 135 and identify data in data output buffer 135 that was returned from the oldest data request. To distinguish this concept from the "longest resident data", the data from the oldest data request can be termed the "earliest requested data". Continuing the earlier example, if the flash memory chips take on average the same amount of time to return data, then the data satisfying the second data request would be put into data output buffer 135 after the data satisfying the third data request. But since the second data request is the earliest requested data, re-order logic 145 can suggest the data satisfying the second data request be returned before the data satisfying the third data request. (Note that, as shown in this example, the longest resident data is not necessarily the earliest requested data.) There are also other ways in which data can be re-ordered, such as those described below with reference to FIGS. 5-6.

Figure 2:
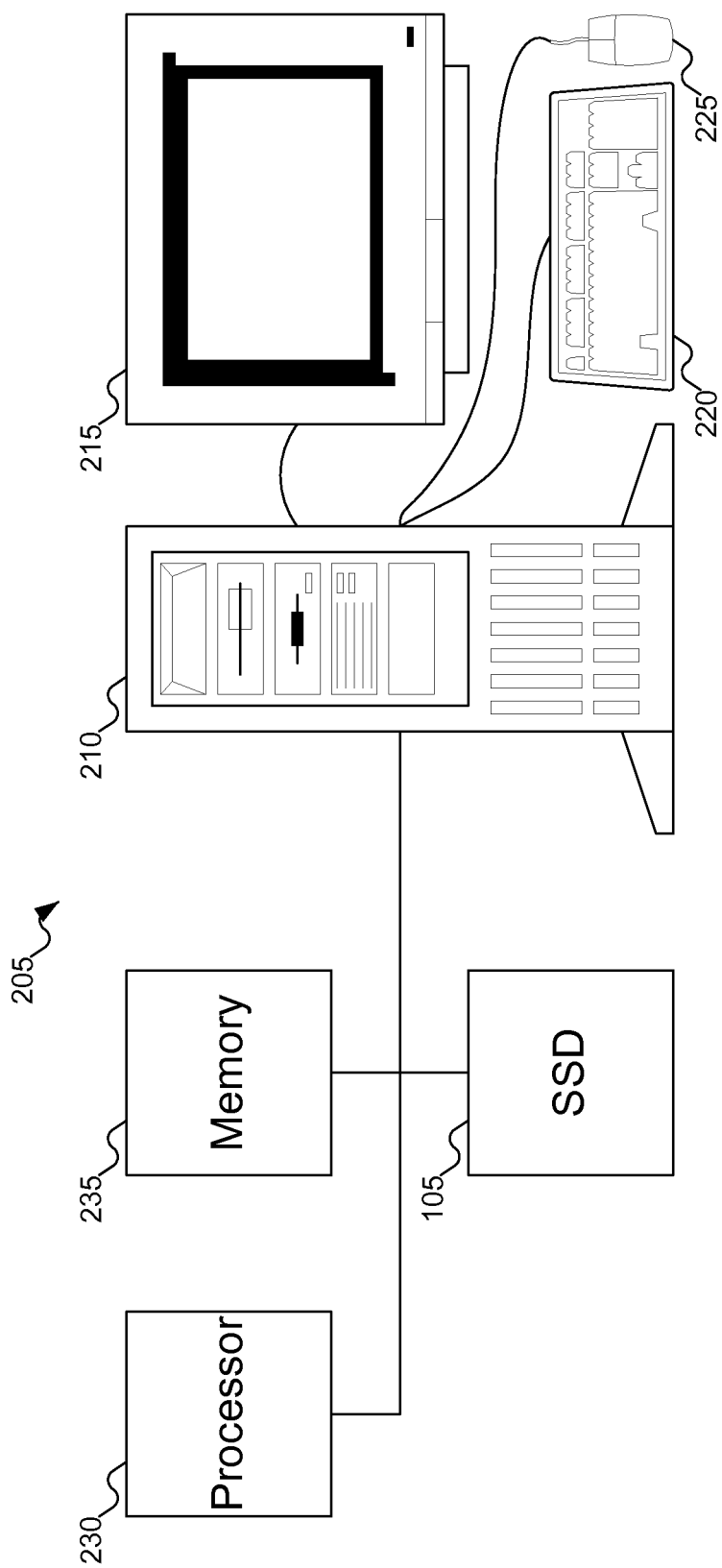
FIG. 2 shows a computer system including the SSD of FIG. 1.

FIG. 2 shows a computer system including SSD 105 of FIG. 1. In FIG. 2, computer system 205 is shown as including computer 210, monitor 215, keyboard 220, and mouse 225. A person skilled in the art will recognize that other components can be included with computer system 205: for example, other input/output devices, such as a printer, may be included. In addition, computer system 205 can include conventional internal components such as central processing unit 230 and memory 235. Computer system 205 can also include SSD 105. Although not shown in FIG. 2, a person skilled in the art will recognize that computer system 205 can interact with other computer systems, either directly or over a network (not shown) of any type. Finally, although FIG. 2 shows computer system 205 as a conventional desktop computer, a person skilled in the art will recognize that computer system 205 can be any type of machine or computing device, including, for example, a laptop computer, a tablet computer, a personal digital assistant (PDA), or a smart phone, among other possibilities.

FIG. 3 shows data requests being received by data input buffer 130 of SSD 105 of FIG. 1. In FIG. 1, data requests are received from host computer system 205. In FIG. 3, data input buffer 130 is shown as a first in, first out (FIFO) queue, but as discussed above, data input buffer 130 can be designed as any type of buffer. The three oldest entries in data input buffer 130, therefore, are the (example) data address 0x1400 (data request 305-1), data address 0x3400 (data request 305-2), and data address 0x1800 (data request 305-3).

Re-order logic 145 (not shown in FIG. 3) can then assign transaction IDs to the data requests. Thus, in this example, data request 305-1 can be assigned transaction ID 9 (transaction ID 310-1), data request 310-2 can be assigned transaction ID 10 (transaction ID 310-2), data request 305-3 can be assigned transaction ID 11 (transaction ID 310-3), and so on. Note that in FIG. 3 transaction IDs have been assigned sequentially, but re-order logic 145 can assign the transaction IDs in any desired manner as long as re-order logic 145 can determine the order in which data requests were received. Further, provided that re-order logic 145 can determine the order in which data requests were received, the transaction IDs do not need to be stored in data input buffer 130 (or data output buffer 135 in FIGS. 4-6), or even be used at all. For example, re-order logic 145 can store the data requests in the order received in storage internal to re-order logic 145.

While the above description assigns re-order logic 145 the responsibility to assign the transaction IDs, a person skilled in the art will recognize that transaction IDs can be assigned by other components. For example, buffer manager 140 can be responsible for assigning transaction IDs to data requests.

Figure 4:
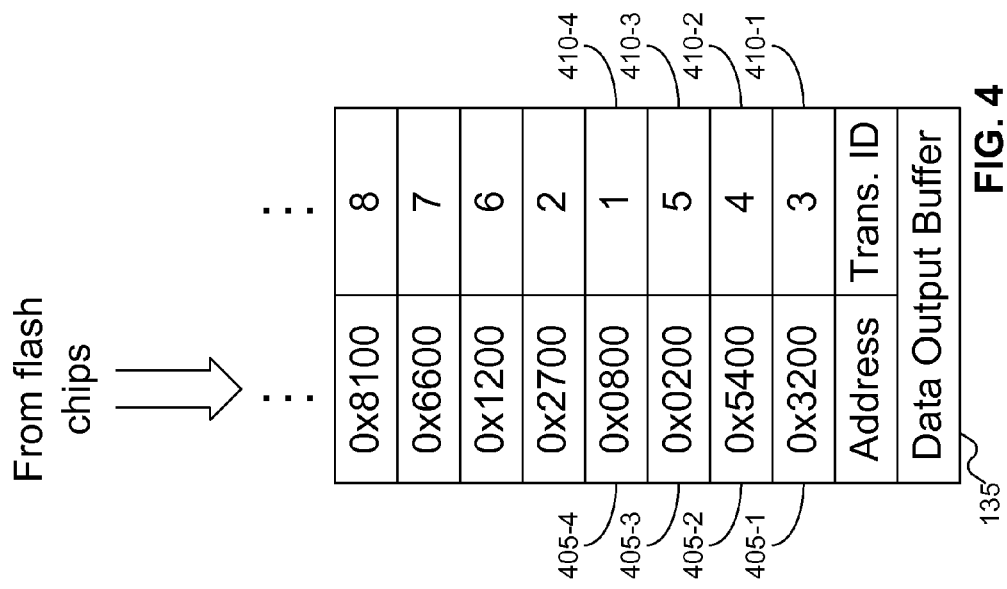
FIG. 4 shows data returned from the flash memory chips to the data output buffer of the SSD of FIG. 1.

FIG. 4 shows data returned from flash memory chips 125-1 through 125-8 to data output buffer 135 of SSD 105 of FIG. 1. In FIG. 4, data output buffer 135 is shown as including, among others, data requests 405-1, 405-2, 405-3, and 405-4, with associated transaction IDs 410-1, 410-2, 410-3, and 410-4. Note that the data requests as returned from flash memory chips 125-1 through 125-8 are not necessarily returned in the same order the requests were made. As can be seen, longest resident data has transaction ID 3 (transaction ID 410-1), whereas the earliest requested data (transaction ID 410-4) was the fourth data request returned. As discussed above with reference to FIG. 3, re-order logic 145 can determine which data to suggest buffer manager 140 without data output buffer 135 storing the transaction IDs. For example, re-order logic 145 can store information about the order of the data requests internally to re-order logic 145.

Figure 5:
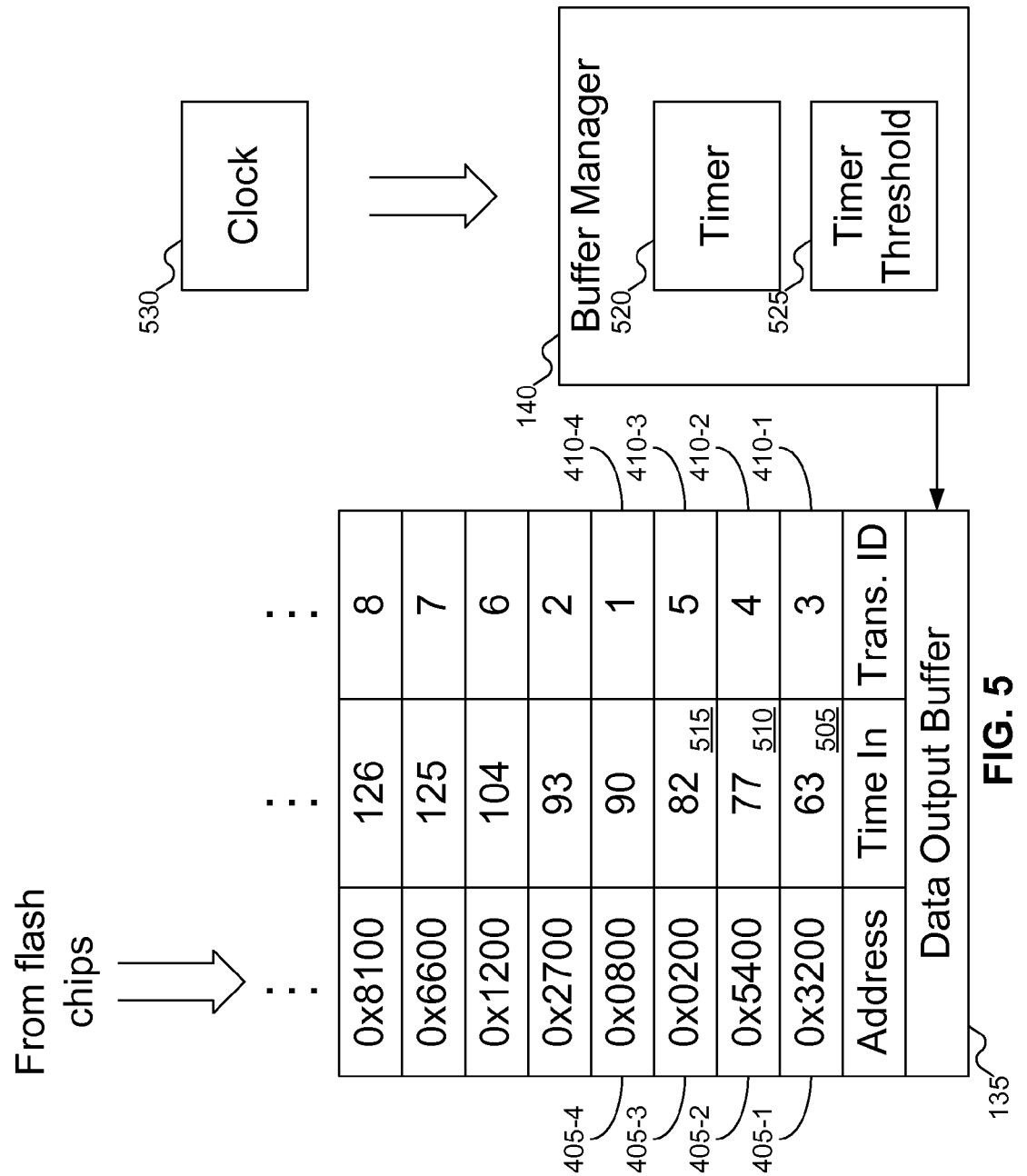
FIG. 5 shows the buffer manager of the SSD of FIG. 1 selecting data for transmission to the host computer based on how long the data has been in the data output buffer, according to an embodiment of the inventive concept.

FIG. 5 shows buffer manager 140 of SSD 105 of FIG. 1 selecting data for transmission to the host computer based on how long the data has been in data output buffer 135, according to an embodiment of the inventive concept. In the embodiment of the inventive concept shown in FIG. 5, data output buffer 135 can include a Time In field. The Time In field can specify the time that a particular data request was added to data output buffer 135. For example, data request 405-1 is shown as having Time In 63 (time in field 505), data request 405-2 is shown as having Time In 77 (time in field 510), data request 405-3 is shown as having Time In 82 (time in field 515), and so on. Note that the data requests in data output buffer 135 are in Time In order. This makes sense, since the longest resident data in data output buffer 135 would have the earliest Time In. In another embodiment of the inventive concept, the Time In entries for various data requests can be stored elsewhere, such as in buffer manager 140.

Buffer manager 140 can also include timer 520 and timer threshold 525. Timer 520 can determine how long a particular data request has been in data output buffer 135. For example, timer 520 can include circuitry to calculate the difference between the current value of clock 530 and the Time In value for a particular data in data output buffer 140, and can compare this calculation with timer threshold 525. If a data has been in data output buffer 135 for longer than timer threshold 525, then buffer manager 140 can burst data out of data output buffer 135, rather than outputting the earliest requested data. Thus, for example, if data request 405-1 has been in data output buffer 135 for longer than timer threshold 525, buffer manager 140 can select data request 405-1 for output rather than data request 405-4 (which has the lowest transaction ID, and therefore would be the earliest requested data). A person skilled in the art will recognize that when buffer manager 140 opts to burst data, buffer manager 140 can select any data for output, and does not have to select the longest resident data in data output buffer 135.

Figure 6:
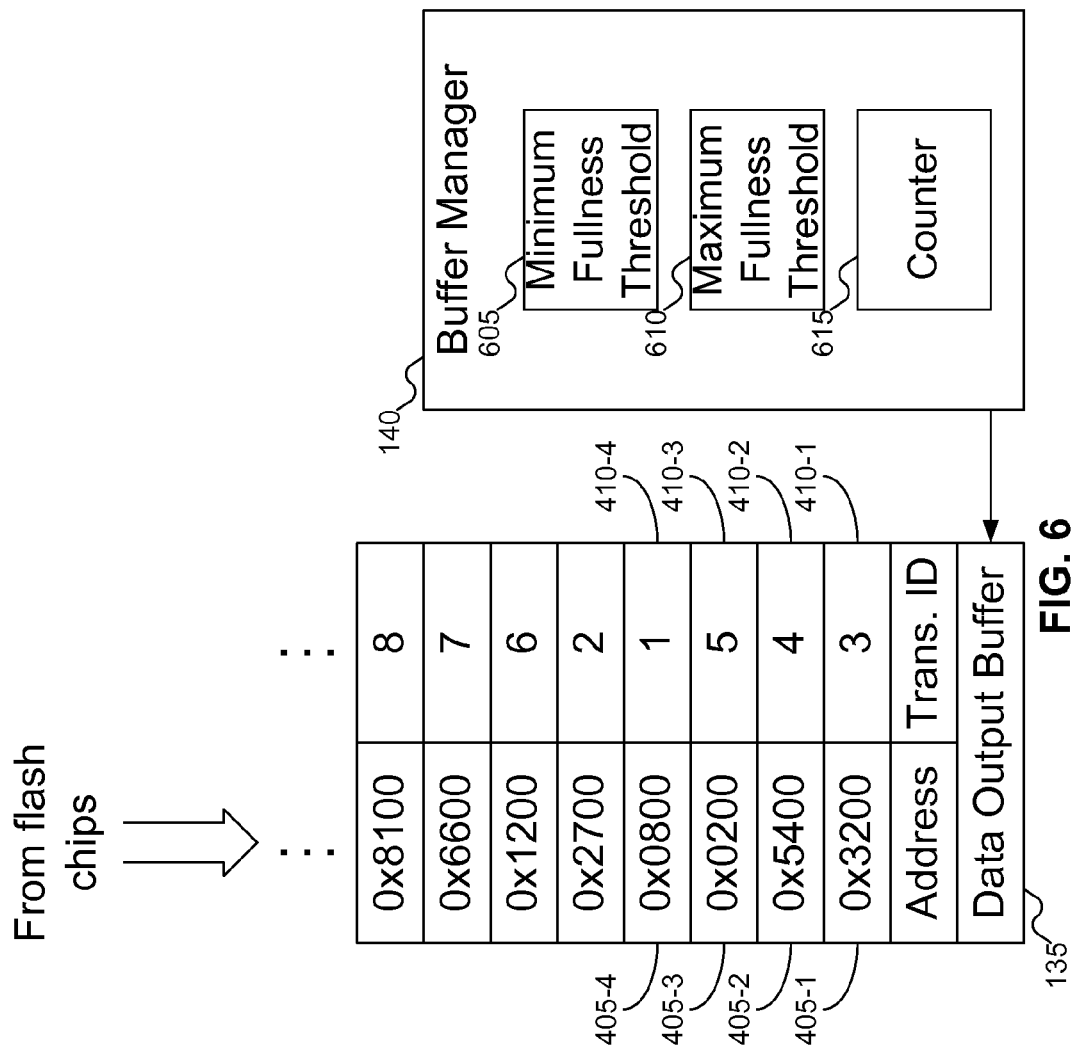
FIG. 6 shows the buffer manager of the SSD of FIG. 1 selecting data for transmission to the host computer based on how full the data output buffer is, according to an embodiment of the inventive concept.

FIG. 6 shows buffer manager 140 of SSD 105 of FIG. 1 selecting data for transmission to the host computer based on how full data output buffer 135 is, according to an embodiment of the inventive concept. In the embodiment of the inventive concept shown in FIG. 6, buffer manager 140 can include minimum fullness threshold 605. If data output buffer 135 has less than minimum fullness threshold 605, then rather than outputting any data, buffer manager 140 can wait until data output buffer 135 has a minimum fullness before selecting a data request to output. Minimum fullness threshold 605 can be represented either as a raw number (i.e., data output buffer 135 must include at least that many data requests before data can be output) or a percentage (data output buffer 135 must be at least that percentage full before data can be output), among other possibilities.

In another embodiment of the inventive concept, buffer manager 140 can include maximum fullness threshold 610. As with minimum fullness threshold 615, maximum fullness threshold 610 can be represented either as a raw number (i.e., data output buffer 135 must include at least that many data requests before data can be output) or a percentage (data output buffer 135 must be at least that percentage full before data can be output), among other possibilities. If data output buffer 135 has more than maximum fullness threshold 610, then buffer manager 140 can burst data from data output buffer 135. As described above with reference to FIG. 3, bursting data can include selecting any data from data output buffer 135 to send back to host computer system 205.

In yet another embodiment of the inventive concept, aspects of the embodiments of the inventive concepts shown in FIGS. 5-6 can be combined. For example, if data output buffer 135 has less than minimum fullness threshold 605, buffer manager 140 can wait until either data output buffer 135 has a minimum fullness, or until some data in data output buffer 135 has been resident in data output buffer 135 for longer than timer threshold 525.

In yet another embodiment of the inventive concept, buffer manager 140 can track which data request (by transaction ID) was last output, using counter 615. Buffer manager 140 can wait until the sequentially next data request submitted to SSD 105 has been buffered in data output buffer 135; when that data is received by data output buffer 135, buffer manager 515 can output that data request. Buffer manager 140 can then increment counter 615 to reflect that another data request was output.

But waiting until the sequentially next data is received by data output buffer 135 could result in too much data waiting for output (for example, data output buffer 135 might be filled before the sequentially next data request is actually ready for output). To address this concern, buffer manager 140 can include maximum fullness threshold 610. If data output buffer 135 has more entries than maximum fullness threshold 610 specifies, buffer manager 140 can burst data even if the sequentially next data for which buffer manager 140 has been waiting is not yet in data output buffer 135. Buffer manager 135 can output whatever data is desired. For example, buffer manager 140 can output the earliest requested data (based on transaction ID) in data output buffer 135, or buffer manager 140 can output the longest resident data (based on Time In, not shown in FIG. 6, or based on the data at the "top" of data output buffer 135).

Figure 7A:
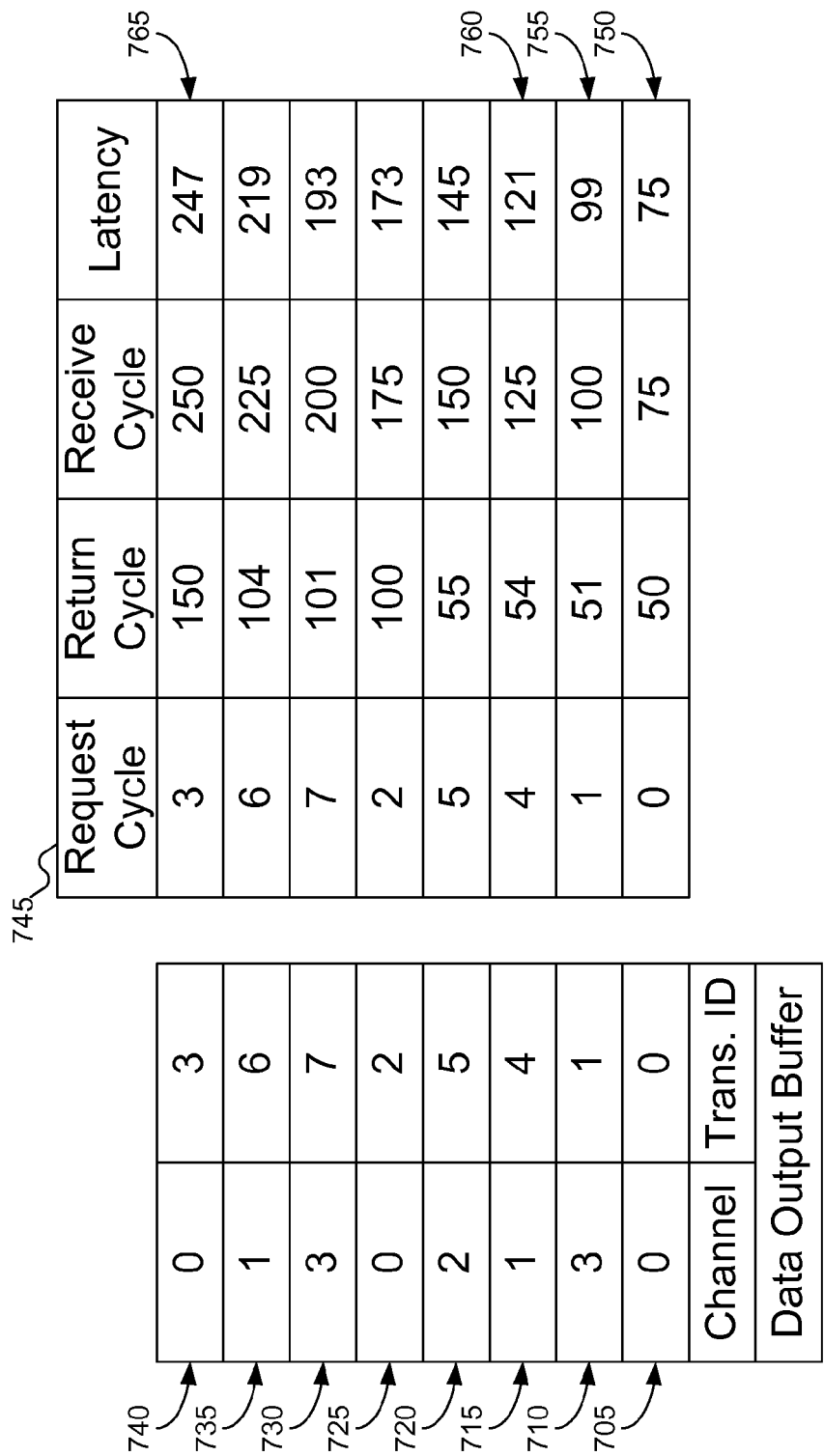
FIG. 7A shows the tail response time of example data requests using an SSD without an embodiment of the inventive concept.

FIGS. 7A and 7B compare the tail response time of example data requests using an SSD with and without an embodiment of the inventive concept. Some assumptions used in FIGS. 7A and 7B are that it takes 50 cycles for a channel to return data from a flash memory chip, and 25 cycles to transfer data from the SSD to the host.

In FIG. 7A, data requests were returned to host computer system 205 in the order in which the data requests were input to data output buffer 135. Data requests 705, 710, 715, 720, 725, 730, 735, and 740 are shown in data output buffer 135. But the host computer did not send the data requests in this order. Table 745 shows the calculation of the tail response times, and shows the cycle in which the requests were received by the SSD. Thus, for example, data request 705 was the first data request, received by the SSD in cycle 0; data request 710 was the second data request, received by the SSD in cycle 1; data request 725 was the third data request, received by the SSD in cycle 2, and so on. Rather than showing the complete memory address, the data requests in data output buffer 135 are shown by channel.

Data request 705 was the first data request, received in cycle 0 and requesting data from channel 0. Data request 705 therefore could be immediately sent to the flash memory chip to be satisfied. Since it took 50 cycles to receive back the data, data request 705 was put in data output buffer 135 in cycle 50. With an additional 25 cycles needed to return the data to host computer system 205, the data was received by host computer system 205 in cycle 75, for a total latency of 75 cycles (tail response time 750).

Data request 710 was the second data request, received in cycle 1 and requesting data from channel 3. Data request 710 therefore could be immediately sent to the flash memory chip to be satisfied. Since it took 50 cycles to receive back the data, data request 710 was put in data output buffer 135 in cycle 51. But during that cycle, host interface logic 110 was occupied with returning the data from data request 705. So data request 710 had to wait until cycle 75 before it could be returned to host computer system 205. Therefore, data request 710 was returned to host computer system 205 in cycle 100, for a total latency of 99 cycles (tail response time 755).

Data requests 725 and 740 were the third and fourth data requests, received in cycles 2 and 3, respectively. But data requests 725 and 740 both requested data from channel 0, which was occupied with returning the data from data request 705. So data request 715, requesting data from channel 1 in cycle 4, was the third data request returned to data output buffer 135 (returned in cycle 54). During that cycle, host interface logic 110 was occupied with returning the data from data request 705, and after that, host interface logic 110 was occupied with returning the data from data request 710. So data request 715 had to wait until cycle 100 before it could be returned to host computer system 205. Therefore, data request 715 was returned to host computer system 205 in cycle 125, for a total latency of 121 cycles (tail response time 760).

Reviewing table 745, the worst tail response time is for data request 740, with a total of 247 cycles (tail response time 765) between when the data was requested and when it was returned to host computer system 205. The worst tail response time occurred for the fourth data request issued by host computer system 205, which was the last data request returned from the flash memory chips.

In contrast, in FIG. 7B, the data requests were issued by host computer system 205 in the same order, in the same cycles, and using the same channels. Data requests 705 and 710 are still the first two data requests returned to host computer system 205, with the same tail response times. But the third data request returned by the SSD in FIG. 7B was data request 725, returned to host computer system 205 in cycle 125. Data request 725 was selected to be returned to host computer system 205 because it had the lowest transaction ID (and therefore was the earliest requested data in data output buffer 135) at cycle 100 (when host interface logic 110 was finished sending the data from data request 710 back to host computer system 205). Continuing the process, the worst tail response time was for data request 730, issued in cycle 7 and returned to host computer system 205 in cycle 250, for a tail response time of 243 cycles (tail response time 770). This is an improvement over the 247 cycle tail response time for data request 740 in FIG. 7A.

It is worth noting that the average response time in FIG. 7B is no worse than the average response time in FIG. 7A (both have average response times of 159 cycles). But the tail response time of FIG. 7B is better than that of FIG. 7A, showing that embodiments of the inventive concept can improve the operation of SSDs.

While the above description focuses on how embodiments of the inventive concept can improve the tail response time of SSDs, embodiments of the inventive concept are applicable in any situation in which data can be returned in a different order than the data was requested. For example, consider what happens when a computer, such as computer system 205, requests a web page from a web site on the Internet. The web page might include images drawn from a variety of web sites, each image requiring a separate request from the appropriate data source. The images might be returned in a different order than requested. If the page has a significant number of images and images lower on the web page are loaded first, viewing the web page before all the images are loaded would be awkward: later loaded images would shift what information is on screen. Other possible applications for embodiments of the inventive concept can include USB flash drives and other data storage devices that include multiple data channels, distributed storage (such as Network Attached Storage (NAS) or cloud storage).

Figure 8:
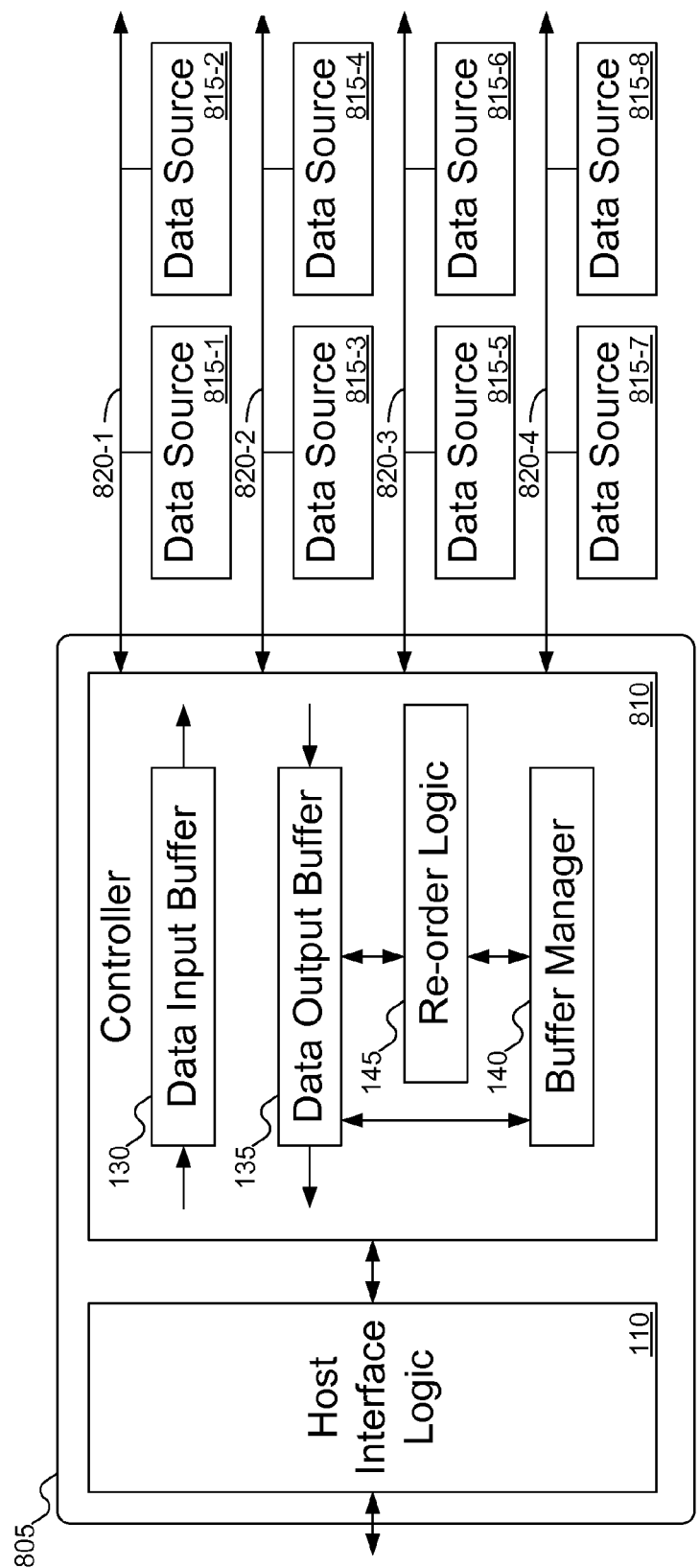
FIG. 8 shows a data management device to manage data returned from a number of data sources, according to an embodiment of the inventive concept.

To improve tail response time for requests from data sources other than SSDs, another embodiment of the inventive concept can be employed. FIG. 8 shows data management device 805, which can manage data returned from a number of data sources, according to an embodiment of the inventive concept. Data management device 805 is similar to SSD 105, except that data management device 805 does not include the sources of data or the channels coupled to controller 810: data sources 815-1, 815-2, 815-3, 815-4, 815-5, 815-6, 815-7, and 815-8 and channels 820-1, 820-2, 820-3, and 820-4 can be external to data management device 805. Data sources 815-1 through 815-8 can be any data sources and channels, located anywhere appropriate; channels 820-1 through 820-4 can be any channels that connect the data sources with data management device 805. (The embodiment of the inventive concept shown in FIG. 8 is merely exemplary: there can be any number of data sources, organized along any number of channels.)

Data management device 805 includes host interface logic 110, which manages receiving data requests from host computer system 205, just as with SSD 105. Data management device 805 also includes controller 810, which can store data requests from host computer system 205 in data input buffer 130, store data from the data sources in data output buffer 135, and use buffer manager 140 and re-order logic 145 to manage data input and output as described earlier.

As an example of how data management device 805 might be implemented, data management device 805 can be included in a network interface card. Since network interface cards can include a networking port and can provide an interface between the computer and a network, a network interface card represents a logical place to include controller 810, in addition to host interface logic 110.

As described above, embodiments of the invention look for the earliest requested data, the longest resident data, or the lowest transaction ID. In general, these embodiments of the invention most reduce the tail response time. But tail response time can be reduced by selecting an earlier requested data even if not the earliest requested data, or by selecting a longer resident data, even if not the longest resident data, or by selecting a lower transaction ID, even if not the lowest transaction ID.

Figure 9A:
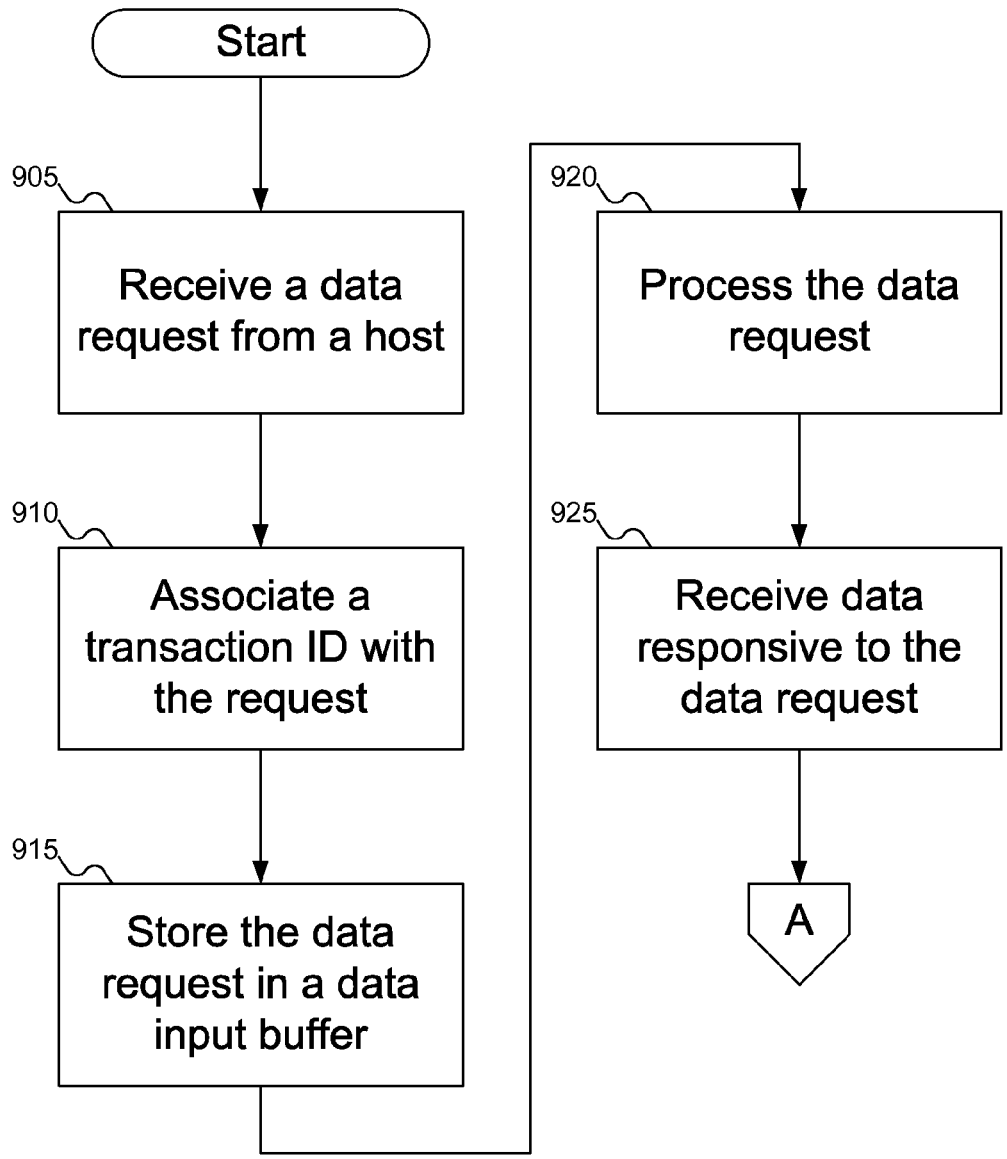
FIGS. 9A-9B show a flowchart of a procedure for the SSD of FIG. 1 or the data management device of FIG. 8 to process data requests to reduce tail response time, according to an embodiment of the inventive concept.
Figure 9B:
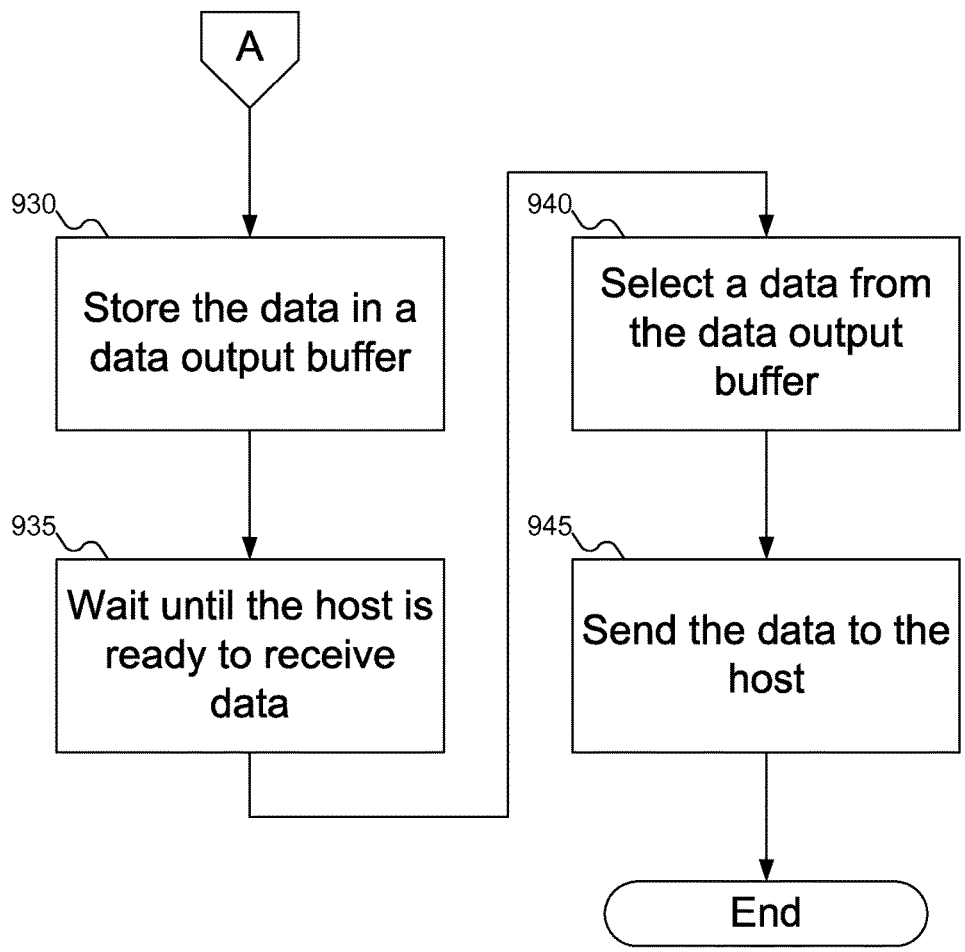

FIGS. 9A-9B show a flowchart of a procedure for the SSD of FIG. 1 or the data management device of FIG. 8 to process data requests to reduce tail response time, according to an embodiment of the inventive concept. In FIG. 9A, at block 905, SSD 105 (via host interface logic 110) receives a data request from host computer system 205. (In the flowcharts, reference is made to operations by SSD 105, but these operations could equally be made by data management device 805. Any reference to SSD 105 is intended to also include a reference to data management device 805). At block 910, re-order logic 145 associates a transaction ID with the data request. As discussed above, associating a transaction ID with a data request can also be done by other components, such as buffer manager 140. Nor is a transaction ID actually required, provided re-order logic 145 can determine an order for various data requests. At block 915, controller 115 stores the data request (and associated transaction ID) in data input buffer 130. At block 920, buffer manager 140 selects the data request to be processed by the appropriate flash memory chip. At block 925, controller 115 receives the data responsive to the data request.

At block 930 (FIG. 9B), controller 115 stores the data in data output buffer 135. At block 935, buffer manager 140 waits until host computer system 205 is ready to receive data. At block 940, buffer manager 140 (advised by re-order logic 145) selects a data from data output buffer 135. And at block 945, SSD 105 (via host interface logic 110) sends the selected data back to host computer system 205.

In FIGS. 9A-9B (and in the other flowcharts below), one embodiment of the inventive concept is shown. But a person skilled in the art will recognize that other embodiments of the inventive concept are also possible, by changing the order of the blocks, by omitting blocks, or by including links not shown in the drawings. In addition, embodiments of the inventive concept can combine aspects of the described individual embodiments. All such variations of the flowcharts are considered to be embodiments of the inventive concept, whether expressly described or not.

Figure 10A:
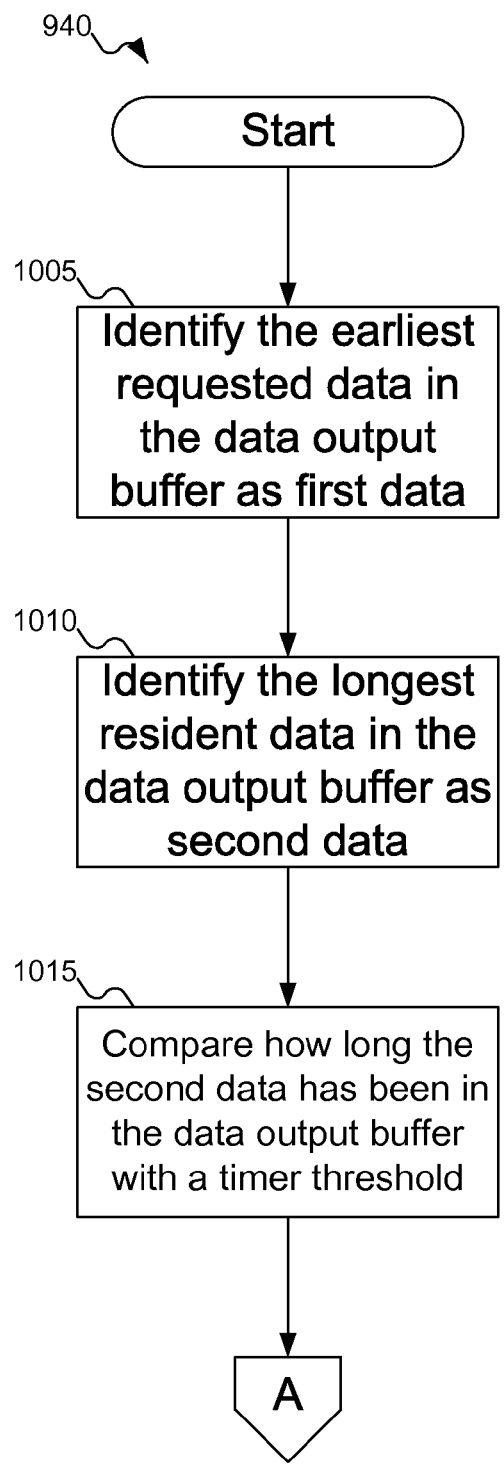
FIGS. 10A-10B show a flowchart of a procedure for the SSD of FIG. 1 or the data management device of FIG. 8 to manage the data output buffer based on how long data has been resident in the data output buffer, according to an embodiment of the inventive concept.
Figure 10B:
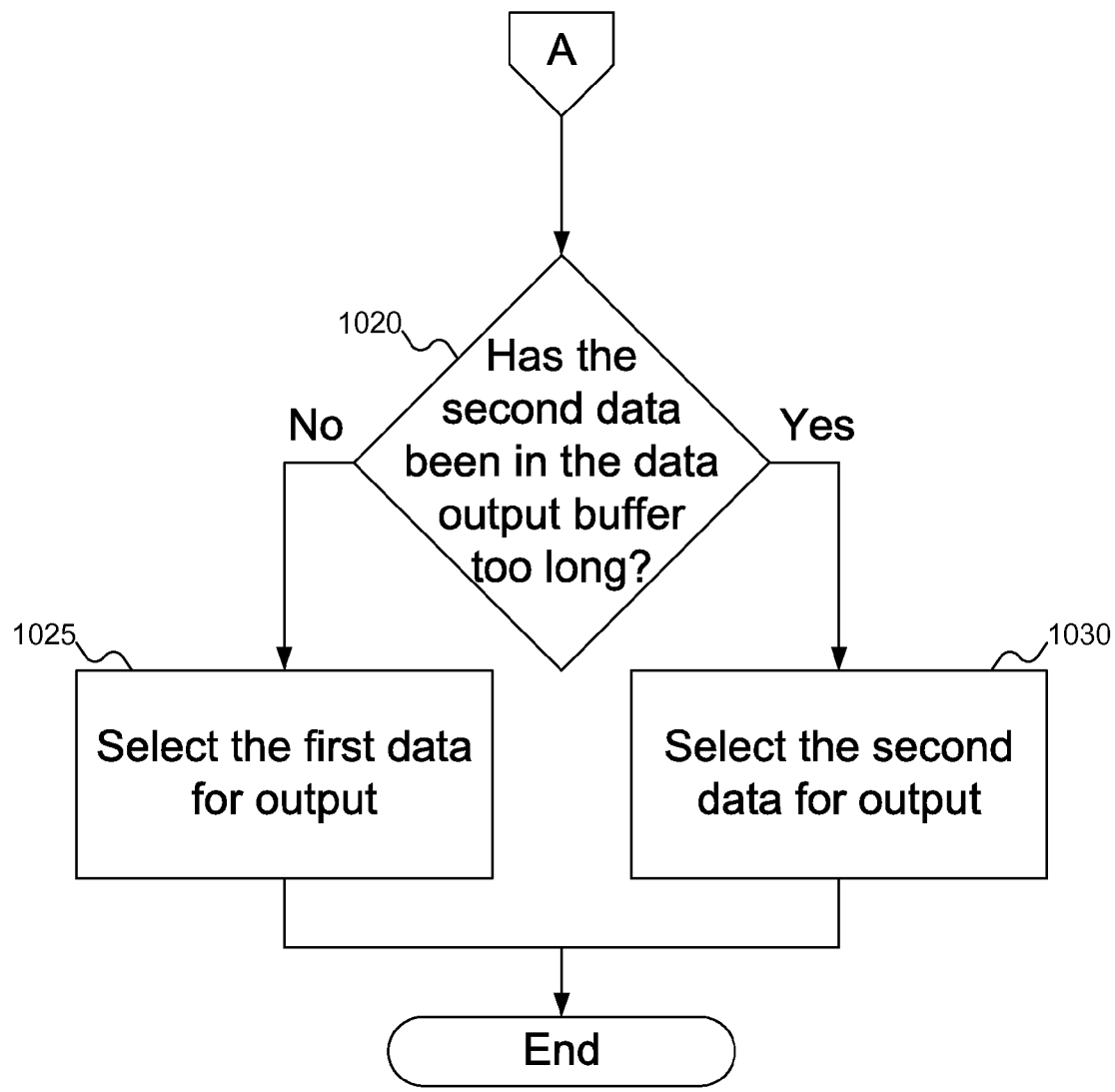

FIGS. 10A-10B show a flowchart of a procedure for SSD 105 of FIG. 1 or data management device 805 of FIG. 8 to manage data output buffer 135 based on how long data has been resident in data output buffer 135, according to an embodiment of the inventive concept. In FIG. 10A, at block 1005, re-order logic 145 identifies an earliest requested data in data output buffer 135: for example, by identifying the data with the lowest transaction ID. At block 1010, buffer manager 145 identifies the longest resident data in data output buffer 135. Typically, the longest resident data in data output buffer 135 is the data at the head of data output buffer 135. At block 1015, buffer manager 140 compares how long the longest resident data has been in data output buffer 135 with timer threshold 525.

At block 1020 (FIG. 10B), buffer manager 140 determines whether the longest resident data has been in data output buffer 135 too long. If not, then at block 1025, buffer manager 140 selects the earliest requested data suggested by re-order logic 145 for output. Otherwise, at block 1030, buffer manager 145 selects the longest resident data in data output buffer 135 for output.

Figure 11A:
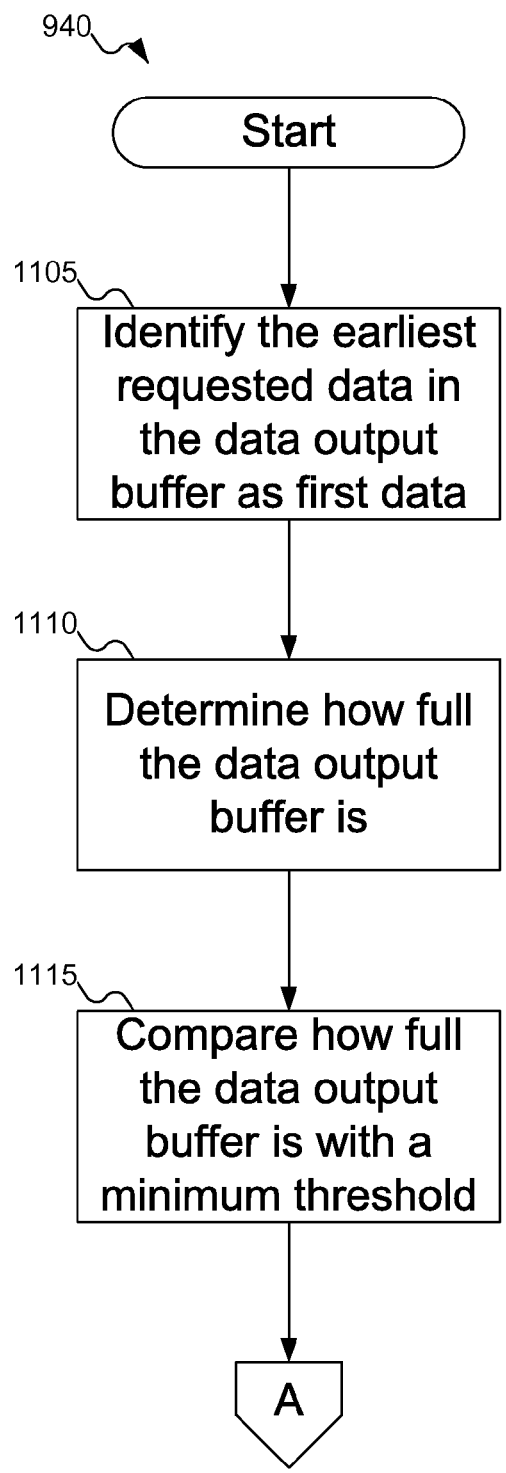
FIGS. 11A-11B show a flowchart of a procedure for the SSD of FIG. 1 or the data management device of FIG. 8 to manage the data output buffer based on how full the data output buffer is, according to an embodiment of the inventive concept.
Figure 11B:
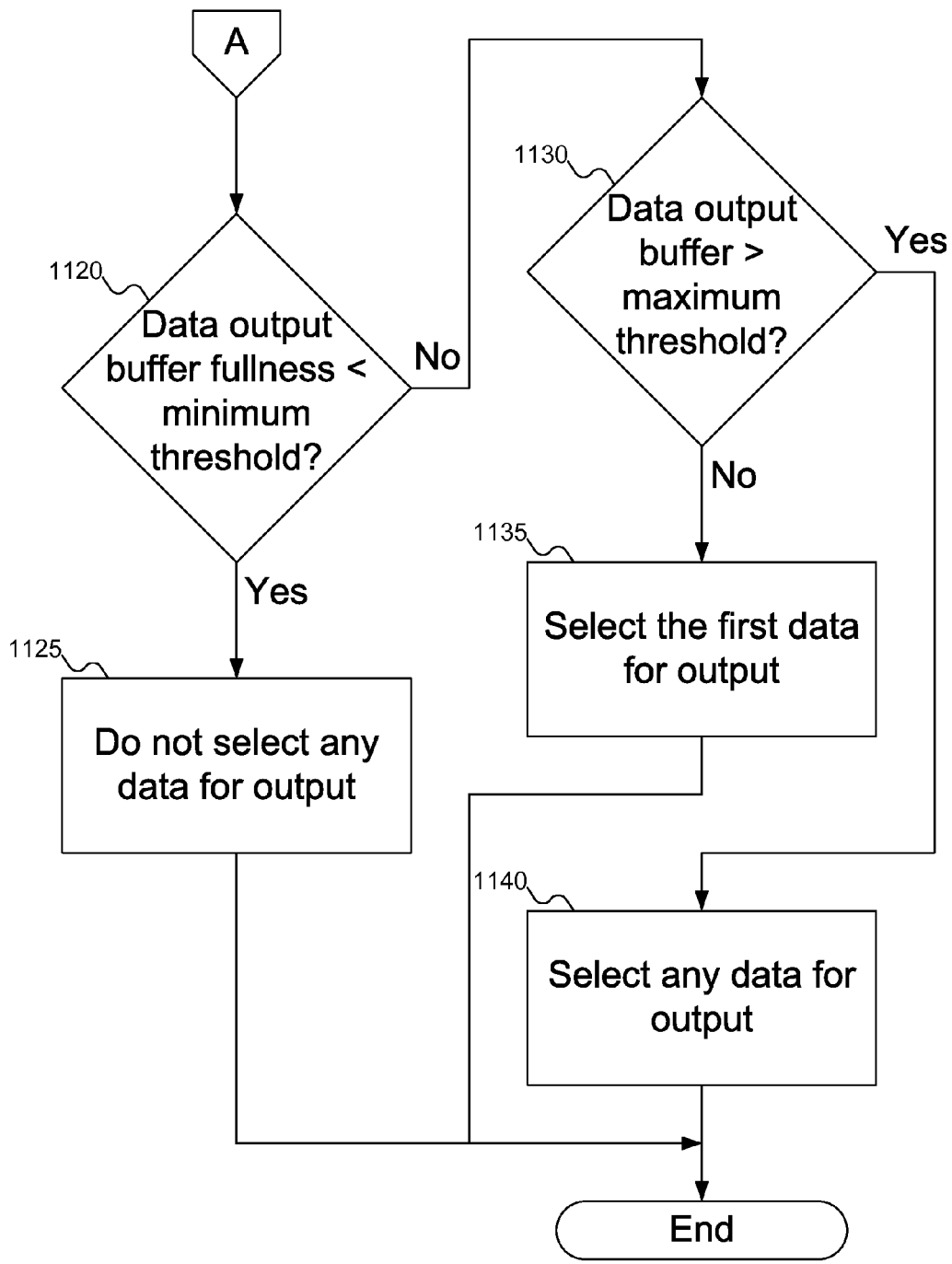

FIGS. 11A-11B show a flowchart of a procedure for SSD 105 of FIG. 1 or data management device 805 of FIG. 8 to manage data output buffer 135 based on how full data output buffer 135 is, according to an embodiment of the inventive concept. In FIG. 11A, at block 1105, re-order logic 145 identifies an earliest requested data in data output buffer 135: for example, by identifying the data with the lowest transaction ID. At block 1110, buffer manager 145 determines how full data output buffer 135 is. At block 1115, buffer manager 140 compares the fullness of data output buffer 135 with minimum fullness threshold 605.

At block 1120 (FIG. 11B), buffer manager 140 determines if data output buffer 135 is less full than minimum fullness threshold 605. If so, then at block 1125 buffer manager 140 does not select any data for output. Otherwise, at block 1130, buffer manager 140 determines if data output buffer 135 is fuller than maximum fullness threshold 610. If not, then buffer manager 1135 selects the data suggested by re-order logic 145 for output. Otherwise, at block 1140, buffer manager 140 selects any desired data (for example, the longest resident data) for output (to burst data).

Figure 12:
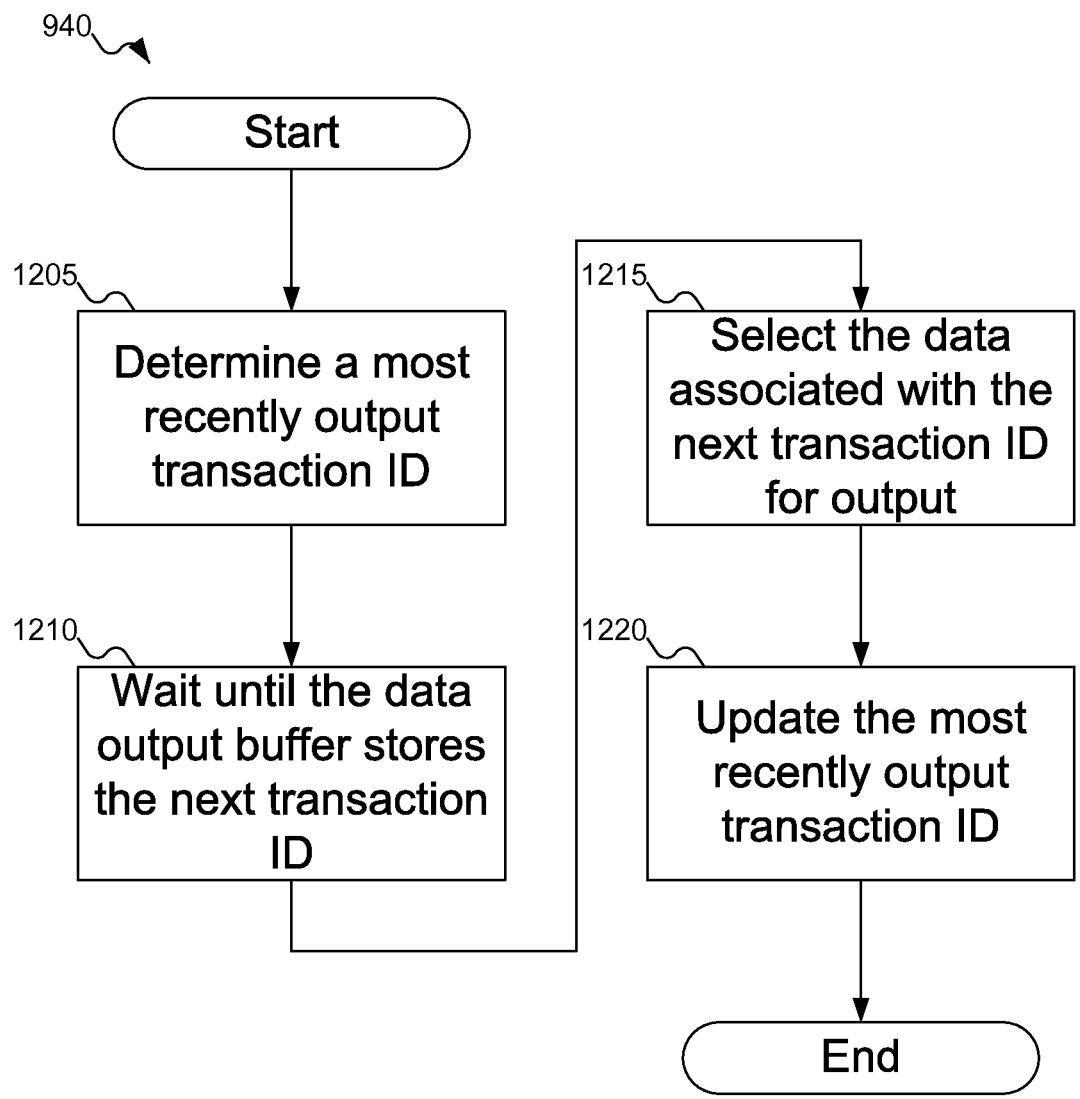
FIG. 12 shows a flowchart of a procedure for the SSD of FIG. 1 or the data management device of FIG. 8 to select a next data for output, according to an embodiment of the inventive concept.

FIG. 12 shows a flowchart of a procedure for the SSD of FIG. 1 or the data management device of FIG. 8 to select a next data for output, according to an embodiment of the inventive concept. At block 1205, buffer manager 140 determines the transaction ID of the most recently output data (for example, using counter 615). At block 1210, buffer manager 140 waits until data associated with the next transaction ID is added to data output buffer 135. At block 1215, buffer manager 140 selects that data for output. And at block 1220, buffer manager 140 updates what transaction ID was associated with the most recently output data.

The various embodiments of the inventive concept described above can be combined. For example, an embodiment of the inventive concept can include re-order logic 145, with buffer manager 140 equipped to burst data if data has been in data output buffer 135 too long (as shown in FIG. 5 and operationally described in FIGS. 10A-10B) and to manage the fullness of data output buffer 135 (as shown in FIG. 6 and operationally described in FIGS. 11A-11B). A person skilled in the art will also recognize other combinations of embodiments of the inventive concept that are possible.

Embodiments of the inventive concept can extend to the following statements, without limitation:

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a buffer manager to select data from the data output buffer to send to the host via the interface; and a re-order logic to advise the buffer manager which data is an earlier requested data.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a buffer manager to select data from the data output buffer to send to the host via the interface; and a re-order logic to assign a transaction ID to each data request received from the host and to select a data from the data output buffer with an oldest transaction ID to advise the buffer manager which data is an earlier requested data.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a buffer manager to select data from the data output buffer to send to the host via the interface; and a re-order logic to assign a transaction ID to each data request received from the host so that an earlier data request has a lower transaction ID than higher transaction ID assigned to a later data request and to select a data from the data output buffer with an oldest transaction ID to advise the buffer manager which data is an earlier requested data.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a buffer manager to select data from the data output buffer to send to the host via the interface; and a re-order logic to assign a transaction ID to each data request received from the host and to select a data from the data output buffer with an oldest transaction ID to advise the buffer manager which data is an earlier requested data using the transaction ID.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a buffer manager to select data from the data output buffer to send to the host via the interface; and a re-order logic to assign a transaction ID to each data request received from the host and to select a data from the data output buffer with an oldest transaction ID to advise the buffer manager which data is an earlier requested data, wherein the buffer manager is operative to send no data to the host via the interface is the data output buffer has a fullness that is less than a second fullness threshold.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a counter to store a most recently output transaction ID; a buffer manager to wait to send data from the data output buffer until a data associated with a next transaction ID is stored in the data output buffer and to select data from the data output buffer to send to the host via the interface; and a re-order logic to assign a transaction ID to each data request received from the host and to select a data from the data output buffer with an oldest transaction ID to advise the buffer manager which data is an earlier requested data, wherein the buffer manager is operative to send no data to the host via the interface is the data output buffer has a fullness that is less than a second fullness threshold.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a counter to store a most recently output transaction ID; a buffer manager to wait to send data from the data output buffer until a data associated with a next transaction ID is stored in the data output buffer, to select data from the data output buffer to send to the host via the interface, and to increment the counter; and a re-order logic to assign a transaction ID to each data request received from the host and to select a data from the data output buffer with an oldest transaction ID to advise the buffer manager which data is an earlier requested data, wherein the buffer manager is operative to send no data to the host via the interface is the data output buffer has a fullness that is less than a second fullness threshold.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a buffer manager to select the earlier requested data from the data output buffer to send to the host via the interface; and a re-order logic to advise the buffer manager which data is an earlier requested data.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a buffer manager to select a second data from the data output buffer to send to the host via the interface that has been in the data output buffer for more than a timer threshold; and a re-order logic to advise the buffer manager which data is an earlier requested data.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a buffer manager to select a second data from the data output buffer to send to the host via the interface that has been in the data output buffer for more than a timer threshold; and a re-order logic to advise the buffer manager which data is an earlier requested data, wherein the buffer manager includes a timer, the buffer manager is operative to assign a time from the timer to each data in the data output buffer when the data was received by the data output buffer, and the difference between a current time and the time assigned to each data identifies how long each data has been in the data output buffer.

An embodiment of the inventive concept includes a solid state drive, comprising: an interface with a host; and a controller coupled to a plurality of channels, each channel coupled to a plurality of flash chips, the controller including: a data input buffer to store data requests received from the host; a data output buffer to store data received from one of the plurality of flash chips; a buffer manager to select any data from the data output buffer to send to the host via the interface when the data output buffer has a fullness that is greater than a first fullness threshold; and a re-order logic to advise the buffer manager which data is an earlier requested data.

An embodiment of the inventive concept includes a method, comprising: receiving a data for a transaction in a data output buffer from a flash chip of a Solid State Drive; selecting a first data associated with a lower associated transaction ID from the data output buffer; and outputting the selected data.

An embodiment of the inventive concept includes a method, comprising: associating a transaction ID with a data request when the data request enters a data input buffer of the SSD; receiving a data for a transaction in a data output buffer from a flash chip of a Solid State Drive; selecting a first data associated with a lower associated transaction ID from the data output buffer; and outputting the selected data.

An embodiment of the inventive concept includes a method, comprising: associating a transaction ID with a data request when the data request enters a data input buffer of the SSD, the transaction ID greater than a second transaction ID for an earlier data request and less than a third transaction ID for a later data request; receiving a data for a transaction in a data output buffer from a flash chip of a Solid State Drive; selecting a first data associated with a lower associated transaction ID from the data output buffer; and outputting the selected data.

An embodiment of the inventive concept includes a method, comprising: receiving a data for a transaction in a data output buffer from a flash chip of a Solid State Drive; selecting a first data associated with a lower associated transaction ID from the data output buffer, including identifying a second data which is a longer resident data in the data output buffer, comparing the longest amount of time for the second data with a timer threshold, and if the longest amount of time for the second data is greater than the timer threshold, selecting the second data instead of the first data for output; and outputting the selected data.

An embodiment of the inventive concept includes a method, comprising: receiving a data for a transaction in a data output buffer from a flash chip of a Solid State Drive; selecting a first data associated with a lower associated transaction ID from the data output buffer, including determining a fullness percentage for the data output buffer, comparing the fullness percentage to a first threshold, and if the fullness percentage is less than the first threshold, not selecting any data for output; and outputting the selected data.

An embodiment of the inventive concept includes a method, comprising: receiving a data for a transaction in a data output buffer from a flash chip of a Solid State Drive; selecting a first data associated with a lower associated transaction ID from the data output buffer, including determining a fullness percentage for the data output buffer, comparing the fullness percentage to a first threshold, if the fullness percentage is less than the first threshold, not selecting any data for output, and if the fullness percentage is greater than a second threshold, selecting a second data that is a longer resident data in the data output buffer; and outputting the selected data.

An embodiment of the inventive concept includes a method, comprising: receiving a data for a transaction in a data output buffer from a flash chip of a Solid State Drive; selecting a first data associated with a lower associated transaction ID from the data output buffer, including determining a most recently output transaction ID, waiting until the data output buffer stores a next transaction ID, selecting a data associated with the next transaction ID as the first data, and updating the most recently output transaction ID; and outputting the selected data.

An embodiment of the inventive concept includes a method, comprising: receiving a data for a transaction in a data output buffer from a flash chip of a Solid State Drive; waiting until a host is ready to receive data from the data output buffer of the SSD; selecting a first data associated with a lower associated transaction ID from the data output buffer; and outputting the selected data.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a buffer manager to select data from the data output buffer to send to the host via the interface; and a re-order logic to advise the buffer manager which data is an earlier requested data.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a buffer manager to select data from the data output buffer to send to the host via the interface; and a re-order logic to assign a transaction ID to each data request received from the host and to select a data from the data output buffer with an oldest transaction ID to advise the buffer manager which data is an earlier requested data.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a buffer manager to select data from the data output buffer to send to the host via the interface; and a re-order logic to assign a transaction ID to each data request received from the host so that an earlier data request has a lower transaction ID than higher transaction ID assigned to a later data request and to select a data from the data output buffer with an oldest transaction ID to advise the buffer manager which data is an earlier requested data.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a buffer manager to select data from the data output buffer to send to the host via the interface; and a re-order logic to assign a transaction ID to each data request received from the host and to select a data from the data output buffer with an oldest transaction ID to advise the buffer manager which data is an earlier requested data using the transaction ID.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a buffer manager to select data from the data output buffer to send to the host via the interface; and a re-order logic to assign a transaction ID to each data request received from the host and to select a data from the data output buffer with an oldest transaction ID to advise the buffer manager which data is an earlier requested data, wherein the buffer manager is operative to send no data to the host via the interface is the data output buffer has a fullness that is less than a second fullness threshold.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a counter to store a most recently output transaction ID; a buffer manager to wait to send data from the data output buffer until a data associated with a next transaction ID is stored in the data output buffer and to select data from the data output buffer to send to the host via the interface; and a re-order logic to assign a transaction ID to each data request received from the host and to select a data from the data output buffer with an oldest transaction ID to advise the buffer manager which data is an earlier requested data, wherein the buffer manager is operative to send no data to the host via the interface is the data output buffer has a fullness that is less than a second fullness threshold.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a counter to store a most recently output transaction ID; a buffer manager to wait to send data from the data output buffer until a data associated with a next transaction ID is stored in the data output buffer, to select data from the data output buffer to send to the host via the interface, and to increment the counter; and a re-order logic to assign a transaction ID to each data request received from the host and to select a data from the data output buffer with an oldest transaction ID to advise the buffer manager which data is an earlier requested data, wherein the buffer manager is operative to send no data to the host via the interface is the data output buffer has a fullness that is less than a second fullness threshold.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a buffer manager to select the earlier requested data from the data output buffer to send to the host via the interface; and a re-order logic to advise the buffer manager which data is an earlier requested data.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a buffer manager to select a second data from the data output buffer to send to the host via the interface that has been in the data output buffer for more than a timer threshold; and a re-order logic to advise the buffer manager which data is an earlier requested data.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a buffer manager to select a second data from the data output buffer to send to the host via the interface that has been in the data output buffer for more than a timer threshold; and a re-order logic to advise the buffer manager which data is an earlier requested data, wherein the buffer manager includes a timer, the buffer manager is operative to assign a time from the timer to each data in the data output buffer when the data was received by the data output buffer, and the difference between a current time and the time assigned to each data identifies how long each data has been in the data output buffer.

An embodiment of the inventive concept includes a data management device, comprising: an interface with a host; and a controller coupled to a plurality of data sources, the controller including: a data input buffer to store data requests received from the host; a data output buffer to store data received from one of the plurality of data sources; a buffer manager to select any data from the data output buffer to send to the host via the interface when the data output buffer has a fullness that is greater than a first fullness threshold; and a re-order logic to advise the buffer manager which data is an earlier requested data.

An embodiment of the inventive concept includes a method, comprising: receiving a data for a transaction in a data output buffer from a data source; selecting a first data associated with a lower associated transaction ID from the data output buffer; and outputting the selected data.

An embodiment of the inventive concept includes a method, comprising: associating a transaction ID with a data request when the data request enters a data input buffer of a data management device; receiving a data at the data management device for a transaction in a data output buffer from a data source; selecting a first data associated with a lower associated transaction ID from the data output buffer; and outputting the selected data.

An embodiment of the inventive concept includes a method, comprising: associating a transaction ID with a data request when the data request enters a data input buffer of a data management device, the transaction ID greater than a second transaction ID for an earlier data request and less than a third transaction ID for a later data request; receiving a data at the data management device for a transaction in a data output buffer from a data source; selecting a first data associated with a lower associated transaction ID from the data output buffer; and outputting the selected data.

An embodiment of the inventive concept includes a method, comprising: receiving a data at a data management device for a transaction in a data output buffer from a data source; selecting a first data associated with a lower associated transaction ID from the data output buffer, including identifying a second data which is a longer resident data in the data output buffer, comparing the longest amount of time for the second data with a timer threshold, and if the longest amount of time for the second data is greater than the timer threshold, selecting the second data instead of the first data for output; and outputting the selected data.

An embodiment of the inventive concept includes a method, comprising: receiving a data at a data management device for a transaction in a data output buffer from a data source; selecting a first data associated with a lower associated transaction ID from the data output buffer, including determining a fullness percentage for the data output buffer, comparing the fullness percentage to a first threshold, and if the fullness percentage is less than the first threshold, not selecting any data for output; and outputting the selected data.

An embodiment of the inventive concept includes a method, comprising: receiving a data at a data management device for a transaction in a data output buffer from a data source; selecting a first data associated with a lower associated transaction ID from the data output buffer, including determining a fullness percentage for the data output buffer, comparing the fullness percentage to a first threshold, if the fullness percentage is less than the first threshold, not selecting any data for output, and if the fullness percentage is greater than a second threshold, selecting a second data that is a longer resident data in the data output buffer; and outputting the selected data.

An embodiment of the inventive concept includes a method, comprising: receiving a data at a data management device for a transaction in a data output buffer from a data source; selecting a first data associated with a lower associated transaction ID from the data output buffer, including determining a most recently output transaction ID, waiting until the data output buffer stores a next transaction ID, selecting a data associated with the next transaction ID as the first data, and updating the most recently output transaction ID; and outputting the selected data.

An embodiment of the inventive concept includes a method, comprising: receiving a data at a data management device for a transaction in a data output buffer from a data source; waiting until a host is ready to receive data from the data output buffer of the data management device; selecting a first data associated with a lower associated transaction ID from the data output buffer; and outputting the selected data.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A solid state drive (SSD), comprising:
   an interface with a host; and
   a controller coupled to a plurality of channels, each channel coupled to a plurality of flash chips, the controller including:
      a data input buffer to store data requests received from the host;
      a data output buffer to store data received from one of the plurality of flash chips;
      a buffer manager including a timer, the buffer manager operative to assign a time from the timer to each data in the data output buffer when the data was received by the data output buffer and to select data from the data output buffer to send to the host via the interface; and
      a re-order logic to advise the buffer manager which data is an earlier requested data, wherein the buffer manager is operative to select a second data from the data output buffer that has been in the data output buffer for more than a timer threshold, and
      wherein a difference between a current time and the time assigned to each data identifies how long each data has been in the data output buffer.

2. An SSD according to claim 1, wherein the re-order logic is operative to assign a transaction ID to each data request received from the host and to select a data from the data output buffer with an oldest transaction ID.

3. An SSD according to claim 2, wherein the re-order logic is operative to advise the buffer manager which data is the earlier requested data using the transaction ID.

4. An SSD according to claim 2, wherein the buffer manager is operative to send no data to the host via the interface when the data output buffer is not empty but has a fullness that is less than a second fullness threshold.

5. An SSD according to claim 4, wherein:
   the controller further includes a counter to store a most recently output transaction ID; and
   the buffer manager is operative to wait to send data from the data output buffer until a data associated with a next transaction ID is stored in the data output buffer.

6. An SSD according to claim 5, wherein the buffer manager is further operative to increment the counter.

7. An SSD according to claim 2, wherein the re-order logic is operative to assign transaction IDs to data requests so that an earlier data request has a lower transaction ID than higher transaction ID assigned to a later data request.

8. An SSD according to claim 1, wherein the buffer manager is operative to select the earlier requested data from the data output buffer to send to the host via the interface.

9. An SSD according to claim 4, wherein the buffer manager is operative to select data from any location in the data output buffer when the data output buffer has a fullness that is greater than a first fullness threshold.

10. A data management device, comprising:
an interface with a host; and
a controller coupled to a plurality of data sources, the controller including:
 a data input buffer to store data requests received from the host;
 a data output buffer to store data received from one of the plurality of data sources;
 a buffer manager to select data from the data output buffer to send to the host via the interface; and
 a re-order logic to advise the buffer manager which data is an earlier requested data,
wherein each of the plurality of data sources may process data requests in parallel, and
wherein the buffer manager is operative to send no data to the host via the interface when the data output buffer is not empty but has a fullness that is less than a second fullness threshold, and the buffer manager is operative to select data from any location in the data output buffer when the data output buffer has a fullness that is greater than a first fullness threshold.

11. A solid state drive (SSD), comprising:
an interface with a host; and
a controller coupled to a plurality of channels, each channel coupled to a plurality of flash chips, the controller including:
 a data input buffer to store data requests received from the host;
 a data output buffer to store data received from one of the plurality of flash chips;
 a buffer manager to select data from the data output buffer to send to the host via the interface; and
 a re-order logic to assign a transaction ID to each data request received from the host, to advise the buffer manager which data is an earlier requested data, and to select a data from the data output buffer with an oldest transaction ID,
wherein the buffer manager is operative to send no data to the host via the interface when the data output buffer is not empty but has a fullness that is less than a second fullness threshold and the buffer manager is operative to select data from any location in the data output buffer when the data output buffer has a fullness that is greater than a first fullness threshold.

12. An SSD according to claim 11, wherein the re-order logic is operative to advise the buffer manager which data is the earlier requested data using the transaction ID.

13. An SSD according to claim 11, wherein:
the controller further includes a counter to store a most recently output transaction ID; and
the buffer manager is operative to wait to send data from the data output buffer until a data associated with a next transaction ID is stored in the data output buffer.

14. An SSD according to claim 13, wherein the buffer manager is further operative to increment the counter.

15. An SSD according to claim 11, wherein the re-order logic is operative to assign transaction IDs to data requests so that an earlier data request has a lower transaction ID than higher transaction ID assigned to a later data request.

16. An SSD according to claim 11, wherein the buffer manager is operative to select the earlier requested data from the data output buffer to send to the host via the interface.

17. An SSD according to claim 11, wherein the buffer manager is operative to select a second data from the data output buffer that has been in the data output buffer for more than a timer threshold.

* * * * *